Sept. 12, 1933.   T. A. REILLY ET AL   1,926,174
BRAKE ACTUATING MECHANISM
Filed Sept. 23, 1930   2 Sheets-Sheet 1
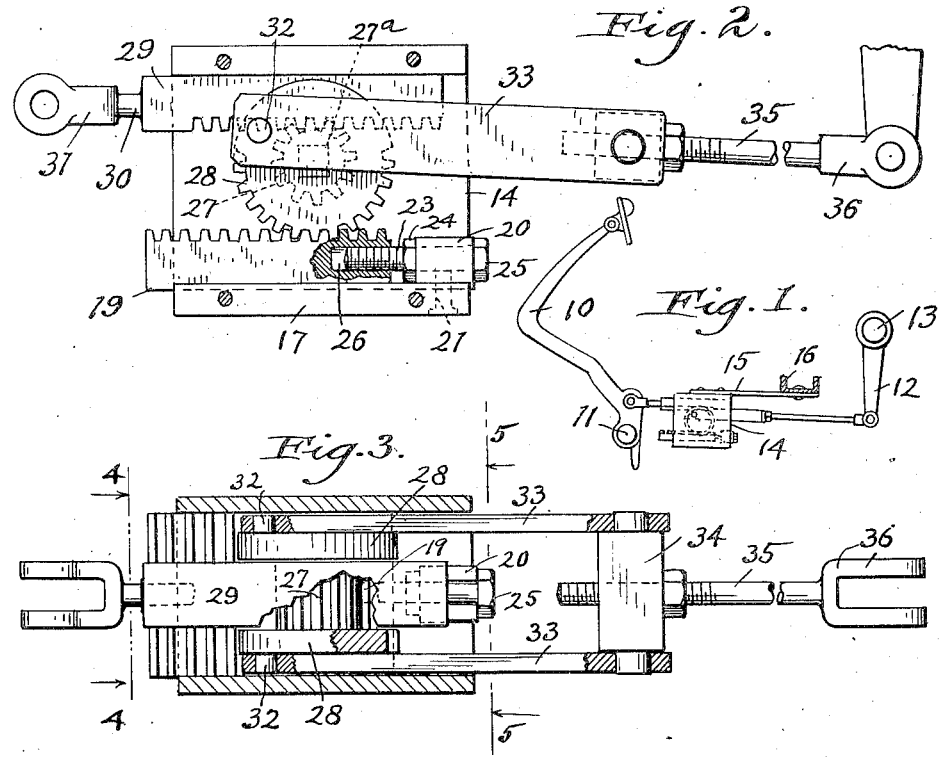
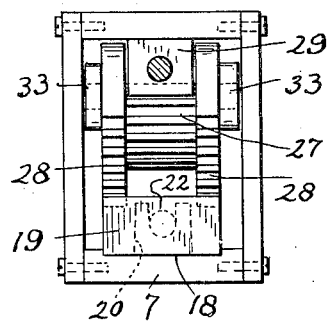
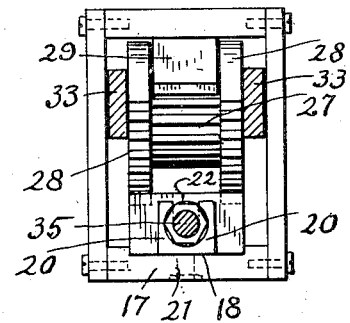
Inventors,
Thomas A. Reilly
Edward S. Cohen
Kwis Hudson & Kent
attys

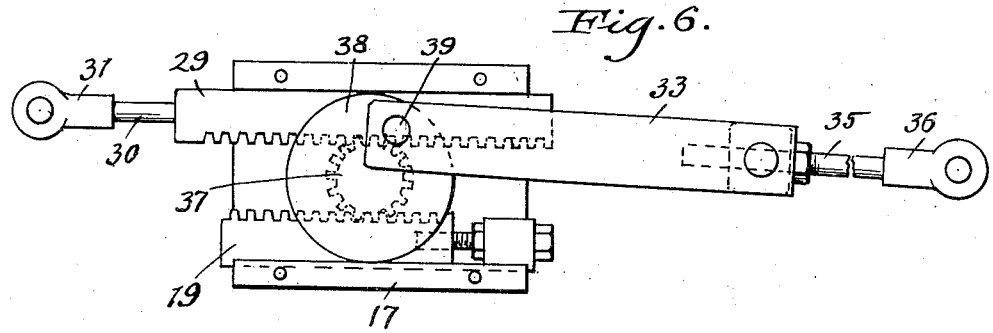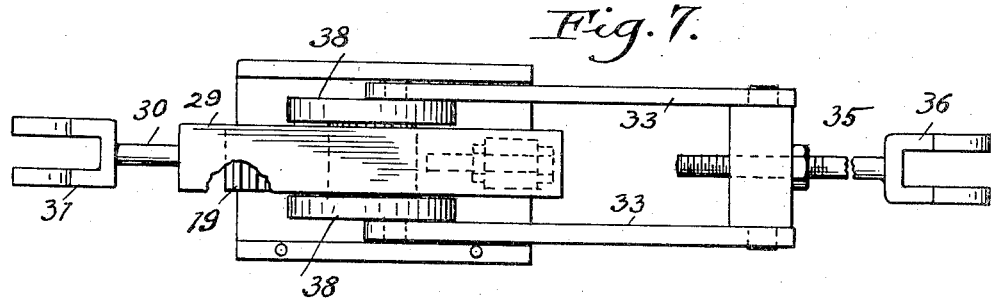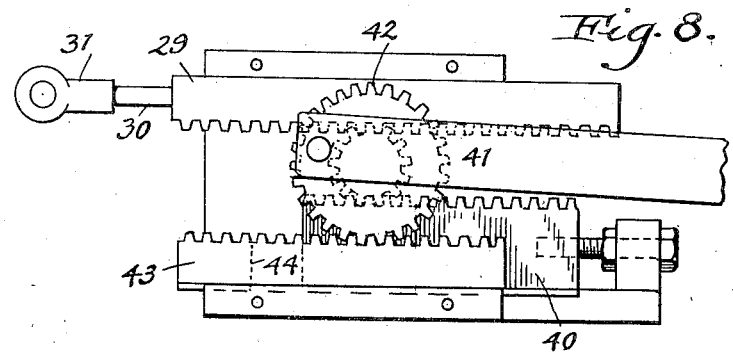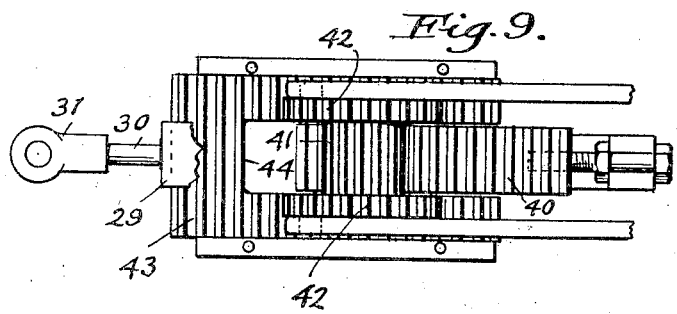

UNITED STATES PATENT OFFICE 1,926,174

BRAKE ACTUATING MECHANISM

Thomas A. Reilly, Lakewood, and Edward S. Cohen, Shaker Heights, Ohio

Application September 23, 1930
Serial No. 483,841

5 Claims. (Cl. 74—110)

This invention relates to a brake actuating mechanism which has particular utility in connection with the brake mechanism of automotive vehicles, although, of course, it has utility with various other forms of brake mechanism.

An object of the invention is to provide a brake actuating mechanism capable of effecting a quick take-up of slack or looseness in the brake parts at the commencement of the application of the brake actuating force, and, in addition, provides for a greatly increased leverage for such force toward the end of the application thereof.

More specifically, an object of the invention is to provide a mechanism which may be used with the brake mechanism of a motor vehicle to enable the operator of the vehicle to apply the brakes thereof with a minimum effort and with a minimum amount of travel of the brake foot pedal of the vehicle.

A further object is to provide a mechanism of this character which may be readily attached to various types and makes of motor vehicles without substantial change in the brake mechanism thereof and without any alteration of the vehicle frame.

A still further and additional object of the invention is to provide mechanism of this character which may be advantageously installed and used in various types and makes of motor vehicles irrespective of the amount of travel of the brake rod from the foot pedal to the cross shaft or equalizer of the brake mechanism, since the mechanism of the present invention will function equally as advantageously and efficiently where such travel is small or below the normal amount found in most motor vehicles, as where such travel is large.

Additional objects and advantages of the invention will become more apparent hereinafter during the following detailed description of several embodiments thereof.

In the accompanying drawings illustrating the several embodiments of the invention mentioned, Fig. 1 is a reduced diagrammatic view showing the mechanism embodied in one form of the invention, mounted upon the frame of a motor vehicle and the relation which the mechanism has with respect to the brake foot pedal and the cross shaft or equalizer of the brake mechanism of the vehicle;

Fig. 2 is a side elevational view of the mechanism shown in Fig. 1, certain of the parts being broken away and shown in section, while the side plate of the mechanism casing is omitted in order to clearly show the operative parts thereof;

Fig. 3 is a top plan view of Fig. 2 with the top plate of the mechanism omitted and certain portions of the parts thereof broken away and shown in section;

Fig. 4 is an end elevational view of the mechanism taken from the left-hand side of Fig. 3 along the line 4—4 and showing the brake pedal connecting rod in section;

Fig. 5 is an end elevation of the mechanism taken along the line 5—5 of Fig. 3 looking in the direction of the arrows, the draw bars connecting the mechanism to the brake rod and equalizer being shown in section;

Fig. 6 is a view similar to Fig. 2 showing a modified form of the invention;

Fig. 7 is a view similar to Fig. 3 but showing the form disclosed in Fig. 6;

Fig. 8 is a view similar to Fig. 2 but showing another modified form of the invention; and Fig. 9 is a top plan view of the form shown in Fig. 8 with the top plate of the casing omitted.

Referring to Fig. 1 of the drawings, the brake foot pedal 10 is shown therein as fulcrumed on the shaft 11 in the manner usually found in motor vehicles. Ordinarily, the pedal 10 is operatively connected by a brake rod to an arm 12, which in turn is operatively associated with the brake cross shaft or equalizer 13 of the vehicle brake mechanism. It is proposed to employ the mechanism of the present invention by arranging the same as part of the operative connection between the brake pedal and the cross shaft or equalizer of the vehicle brake mechanism, and, in the detailed description to follow, the brake actuating mechanism of the present invention will be so described.

The mechanism comprises a casing 14 preferably rectangular in cross-section and open at its opposite ends to permit freedom of movement of the operative parts of the mechanism, such casing being constructed in any desired manner, in so far as the way in which its plates are interconnected. Of course, in order to exclude dust or dirt from the mechanism, it is proposed to employ, in actual use thereof, a loosely fitting fabric cover or hood serving such end, but, at the same time, permitting the extended movable parts of the mechanism freedom of operation.

As shown in Fig. 1, a strap 15 is secured to the top plate of the casing 14 and enables the mechanism to be conveniently secured in position upon the vehicle to the cross channel 16 usually found on motor vehicle frames between the brake pedal and the cross shaft or equalizer 13 of the brake mechanism, as is well understood in the art. Although the strap 15 has been disclosed herein as forming the securing means, it should be understood that other means might be provided, as, for example, the top plate of the casing 14 could be extended rearwardly to serve as a securing strap, and in some ways such arrangement would be preferable, since if bolts or rivets are used to secure the strap 15 to the casing there would be likelihood of the same interfering with the proper operation of some of the movable parts of the mechanism or it would be necessary to make such top plate of inconvenient thickness to form sufficient anchorage for the bolts.

The bottom plate of the casing, designated herein by the numeral 17, is provided with a longitudinally extending centrally located groove 18, clearly shown in Figs. 4 and 5, and within which is arranged a rack bar 19. The rack bar 19 is adapted to be held fixed during the operation of the mechanism, but, for a purpose to be later explained, is preferably adjustably mounted in the groove 18. To this end, an adjusting screw block 20 is fixed in the groove 18 at the end thereof which is to be arranged adjacent the equalizer 13 of the brake mechanism, such block having an integral stud portion 21 secured in the plate 17 and also a slot 22 extending downwardly and centrally of the block from the upper edge thereof. An adjusting screw 23 is rotatably supported in the slot 22 of the block 20 between a nut 24 engaging the inner side of the block and a head 25 formed on the screw and engaging the outer side of the block. The rear end of the rack bar 19 is provided with a threaded recess 26 within which the forward end of the adjusting screw 23 is screwed, from which it will be seen that in order to vary or adjust the position of the rack bar 19 longitudinally of the groove 18, it is merely necessary to turn the head 25 of the adjusting screw to bring said rack bar nearer to or farther away from the block 20.

The mechanism further includes a pinion 27 fixed on a transverse shaft the opposite ends 27a of which project from the opposite ends of the pinion and are square in cross-section so as to operatively receive thereon the square openings of gears 28. The gears 28 may be termed travel gears and are, in effect, mutilated gears, since only a portion of the circumference is provided with teeth, there being shown in the drawings only thirteen teeth upon these gears. The gears 28 mesh with the rack 19 and are of such diameter that they extend from the rack 19 to a point closely adjacent the top plate of the casing 14, thus being substantially larger in diameter than the pinion 27.

A sliding rack bar 29 is arranged in the casing adjacent the top plate thereof and moves between the gears 28, in mesh with the upper side of pinion 27. The end of the rack bar 29, adjacent the brake pedal 10, is provided with a central threaded recess so that one end of a rod 30 may be connected thereto, the other end of the rod 30 being provided with a clevis 31 by which it is connected to the brake pedal 10.

Each gear 28 carries a pin 32 extending outwardly toward the side plates of the casing and located near the circumference of the gear and adjacent one end of the series of teeth formed in the gear. The pins 32 may be said to constitute crank pins and are adapted, when properly aligned with each other, to fit in openings formed in one end of draw-bars 33, which draw-bars extend rearwardly from the casing toward the equalizer 13 of the brake mechanism. The other end of the draw-bars 33 operatively associated with the gears 28 are interconnected by means of a draw-bar spacer 34, which spacer, in turn, has threadedly and adjustably attached thereto a rod 35 provided with a clevis 36 by means of which the rod 35 is operatively connected with the arm 12 of the cross shaft or equalizer 13 of the brake mechanism.

When the mechanism is being installed upon a motor vehicle, the rack bar 19 is adjusted to a point such that the pins 32 carried by the gears 28 are slightly to the left of the vertical center through the gears, as viewed in Fig. 2; the teeth of the gears farthest removed from the pins 32 should then be meshing with the rack teeth adjacent the rear end of the rack 19, the rack 29 being adjusted by the screw 23 to the proper position and until the brake pedal 10 will be in inactive position and will have its foot receiving portion a substantial distance above the floor boards of the vehicle.

It is of course understood that, when these positions are attained, the positions of the arm 12 and equalizer 13 of the brake mechanism are such as to insure the full released position of the brakes, it being remembered that the rod 35 is susceptible of adjustment.

When the mechanism has been thus installed and adjusted and the operator of the motor vehicle depresses the brake pedal 10, the rod 30 and rack bar 29 are drawn forwardly and since the rack bar 29 is in mesh with the pinion 27, the pinion is rotated in an anti-clockwise direction, as are also the gears 28. The rotation of the gears 28 of course changes the position of the pins 32, the movement of the pins 32 at first effecting the relatively large forward linear movement of the draw-bars 33 to quickly take up the slack or looseness in the brake mechanism of the vehicle, while the continued rotation of the gears 28 results in the pins 32, toward the end of the movement of the gears, passing below the horizontal center line through the gears and providing a greatly increased leverage between the brake pedal and the brakes of the vehicle, thus enabling the operator to apply the brakes with a minimum effort. Due to the adjustment of the rack bar 19, the operative parts of the mechanism may be properly positioned to enable the mechanism to function effectively and efficiently irrespective of the amount of travel of the brake rod from the foot pedal to the equalizer. It will be understood, of course, that as soon as the operator releases the brake pedal 10 the brakes will be released due to the usual return springs and the mechanism of the present invention returned to its initial position. It should be noted that smooth circumference of the mutilated gears 28 adjacent each end of the series of teeth acts as a stop to prevent the gears moving too far in either direction on the rack 19.

In the form of the invention shown in Figs. 6 and 7, the parts of the mechanism that are exact duplicates of the corresponding parts of the form just described will be designated by the same reference characters but will not be described specifically in connection with this second form. However, it should be noted that the pinion 37 is used in place of the pinion 27 and that the pinion 37 meshes with the movable rack bar 29 and with the adjustable fixed rack bar 19. It should further be noted that in this form the gears 28 are omitted and rollers 38 used in their stead, which rollers roll upon the bottom plate 17 of the casing and on opposite sides of the rack bar 19, this bar in the present form being of reduced width as compared to the bar 19 in the form shown in Figs. 2 to 5 inclusive. The rollers 38 are provided with pins 39 similar to the pins 32 of the first described form.

In the operation of the form shown in Figs. 6 and 7, the forward movement of the rack bar 29 upon depressions of the brake pedal 10 will rotate pinion 37 in anti-clockwise direction and cause the same to travel forwardly along the rack bar 19. The rollers 38 roll forwardly in the casing along the bottom plate and the position of the pins 39 changes rapidly at the commencement of the movement to provide for a quick take-up of slack in the brake mechanism while toward the end of the movement the position of the pins will be such as to provide a greatly increased leverage between the brake pedal and the equalizer 13.

The form of the invention shown in Figs. 8 and 9 combines certain of the advantages of the two forms previously described, and for that reason there might be instances where it is preferable to use this latter form. In this third form of the invention, a relatively short fixed rack 40 is mounted upon the bottom plate of the casing while the pinion 41 is arranged to mesh both with the rack 40 and with the movable rack 29. This form of the invention also employs gears 42 similar to the gears 28, such gears meshing with a movable rack 43. The movable rack 43, arranged upon the bottom plate of the casing, is substantially U-shaped in configuration and straddles the rack 40, this latter rack being considerably thicker in vertical depth than the rack 43. When the movable rack 29 is moved forward by the depression of the brake pedal 10, the pinion 41 travels forwardly along the rack 40, while the anti-clockwise rotation of the gears 42 causes rearward movement of the movable rack 43; there being a clearance between the forward end of the rack 40 and the cross portion of the rack 43; such movement of the rack 43 compensating for the different peripheral speeds of the pinion 41 and gears 42. The movable rack 43 is so formed that the inner edge 44 of its cross portion will abut the forward edge of the rack 40 and be stopped in its rearward movement the instant the pinion 41 rolls out of mesh with the rack 40. As soon as this condition has obtained, the further anti-clockwise rotation of the pinion 41 by the rack 29 will cause the gears 42 to roll outwardly along the movable rack 43 which has now become a fixed rack. In this form of the invention, there will be a quick take-up of slack at the commencement of the application of the brake actuating force as the pinion 41 rolls along the rack 40, and a greatly increased leverage when the gears 42 roll along the rack 43 after cessation of the rearward movement of the rack.

From the construction disclosed, it will be apparent that the pins 32 and 39, in operation, follow paths which are modified cycloids, in the first instance the pin being located inside of the generating circle and, in the second instance, the pin being located outside the generating circle. These constructions give a quick take-up during the initial movement of the foot pedal and a multiplied force as the brake is applied. The relation between the amount of movement and the ratio of the force applied may be varied by varying the curve followed by the pins. In the modification shown in Figs. 8 and 9, the generating circle is moved from inside the crank pin to outside the crank pin as the pinion 41 disengages rack 40 and the gear 42 engages rack 43, the result being a more modified cycloid the characteristics of which may be varied to suit the particular application in a manner well known in the art.

Although several embodiments of the invention have been disclosed and described herein, it should be understood that the invention is not to be limited to such embodiments except in so far as the scope of the appended claims so limits it

Having thus described our invention, we claim:

1. A brake actuating device of the type described comprising a casing, a normally fixed rack in said casing, means for adjusting the position of said rack longitudinally of the casing, a movable rack in said casing, and means in said casing operatively connected with both of said racks, said last named means including a pinion meshing with said movable rack, and means eccentrically connected with said second mentioned means and adapted to be operatively connected to the brake mechanism.

2. A brake actuating mechanism of the type described comprising a casing, a normally fixed rack in said casing, means for adjusting said rack longitudinally of the casing, a movable rack in said casing, a floating pinion meshing with said movable rack, mutilated gears of greater diameter than said pinion arranged at the opposite ends thereof and rotatable and movable with said pinion, said gears meshing with said fixed rack, pins carried by said gears outwardly of the center thereof, and draw-bars connected to said pins and adapted to be operatively connected with the brake mechanism.

3. A brake actuating mechanism of the type described comprising a casing, a fixed rack in said casing, a movable rack in said casing, a floating pinion in said casing meshing with both of said racks, rollers in said casing arranged to roll on a surface thereof, said rollers being arranged at the opposite ends of said pinion and rotatable and movable therewith, pins carried by said rollers outwardly of the center thereof, and draw-bars connected to said pins and adapted to be operatively connected with the brake mechanism.

4. A brake actuating mechanism of the type described comprising a casing, a fixed and a movable rack therein, a second movable rack in said casing, a gear meshing with said fixed rack and said first named movable rack, a second gear rotatable with said first mentioned gear and meshing with said second named movable rack, and pin means eccentrically connected to one of said gears adapted to be operatively connected with the brake mechanism.

5. A brake actuating mechanism of the type described comprising a casing, a fixed and a movable rack therein, a second movable rack in said casing, said last mentioned rack being substantially U-shaped and arranged to slidably straddle said fixed rack, a pinion meshing with said fixed rack and said first named movable rack, gears of substantially greater diameter than said pinion and rotatable therewith, said gears being arranged at the opposite ends of said pinion and meshing with said second named movable rack, pins carried by said gears outwardly of the center thereof, and draw-bars connected to said pins and adapted to be operatively connected with the brake mechanism.

THOMAS A. REILLY.
EDWARD S. COHEN.

CERTIFICATE OF CORRECTION.

Patent No. 1,926,174. September 12, 1933.

THOMAS A. REILLY, ET AL.

It is hereby certified that error appears in the printed specification of the above numbered patent requiring correction as follows: Page 3, line 131, claim 4, strike out the word "pin"; and that the said Letters Patent should be read with this correction therein that the same may conform to the record of the case in the Patent Office.

Signed and sealed this 24th day of October, A. D. 1933.

(Seal)

F. M. Hopkins
Acting Commissioner of Patents.